(12) United States Patent
Yang et al.

(10) Patent No.: US 8,839,099 B2
(45) Date of Patent: Sep. 16, 2014

(54) FLASH CONTENT NAVIGATION METHOD, MOBILE ELECTRONIC DEVICE, AND COMPUTER-READABLE MEDIUM

(75) Inventors: Chih-Wei Yang, Taoyuan County (TW); Te-Pei Tseng, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 171 days.

(21) Appl. No.: 13/012,816

(22) Filed: Jan. 25, 2011

(65) Prior Publication Data
US 2011/0191669 A1 Aug. 4, 2011

Related U.S. Application Data

(60) Provisional application No. 61/299,347, filed on Jan. 29, 2010.

(51) Int. Cl.
G06F 3/041 (2006.01)
G06F 3/14 (2006.01)

(52) U.S. Cl.
CPC ...................................... *G06F 3/14* (2013.01)
USPC .......................................... 715/252; 715/243

(58) Field of Classification Search
CPC .......... G06F 2203/04806; G06F 3/017; G06F 3/04886; G06F 3/0485
USPC .......................... 715/200, 201, 204, 243, 252
See application file for complete search history.

(56) References Cited

U.S. PATENT DOCUMENTS

| | | | | |
|---|---|---|---|---|
| 7,479,949 B2* | 1/2009 | Jobs et al. | | 345/173 |
| 7,864,163 B2* | 1/2011 | Ording et al. | | 345/173 |
| 7,917,846 B2* | 3/2011 | Decker et al. | | 715/234 |
| 8,137,200 B2* | 3/2012 | Kelly et al. | | 463/42 |
| 2004/0267899 A1 | 12/2004 | Rahman et al. | | |
| 2008/0174570 A1* | 7/2008 | Jobs et al. | | 345/173 |

(Continued)

FOREIGN PATENT DOCUMENTS

| CN | 101419624 | 4/2009 |
|---|---|---|
| JP | 2006-023605 | 1/2006 |

(Continued)

OTHER PUBLICATIONS

"First Office Action of Europe Counterpart Application", issued on Jun. 29, 2012, p. 1-p. 9.

(Continued)

*Primary Examiner* — Stephen S. Hong
*Assistant Examiner* — Gregory J Vaughn
(74) *Attorney, Agent, or Firm* — Jianq Chyun IP Office

(57) ABSTRACT

A flash content navigation method, a mobile electronic device, and a computer-readable medium are provided, wherein the flash content is embedded in a web page, and a visible area within the web page is predetermined for displaying at least a portion of the flash content. In the method, when receiving a flash navigating signal, a full screen interface is popped up. If a size of the visible area is greater than that of the touch screen, the flash content is scaled down to make the flash content displayed in the visible area fit the size of the touch screen, and the flash content displayed in the visible area is played back by a scaled size. When receiving a flash interacting signal from the touch screen, the flash interacting signal is transmitted to a flash engine to perform an action on the flash content according to the flash interacting signal.

19 Claims, 7 Drawing Sheets

(56) References Cited

U.S. PATENT DOCUMENTS

| | | | |
|---|---|---|---|
| 2009/0093309 A9* | 4/2009 | Patel et al. | 463/42 |
| 2009/0098943 A1* | 4/2009 | Weber et al. | 463/42 |
| 2009/0156303 A1* | 6/2009 | Kiely et al. | 463/29 |
| 2009/0209350 A1* | 8/2009 | Kelly et al. | 463/42 |

FOREIGN PATENT DOCUMENTS

| | | |
|---|---|---|
| JP | 2009-271881 | 11/2009 |
| JP | 2010-503124 | 1/2010 |
| KR | 1020090057421 | 6/2009 |
| WO | 2008139993 | 11/2008 |

OTHER PUBLICATIONS

"Search Report of European Counterpart Application", issued on Jun. 8, 2011, p. 1-p. 5.

Anonymous, "Full-screen UI control for flash", retrieved from http://bbs.blueidea.com/thread-2961231-1-1.html, Dec. 9, 2009, p. 1-4.

"First Office Action of China Counterpart Application", issued on Sep. 5, 2012, p. 1-9, in which the listed references (CN101419624, "Full-screen UI control for flash") were cited.

"Office Action of Korea Counterpart Application with English Translation", issued on Aug. 30, 2012, p. 1-8, in which the listed reference (KR1020090057421) was cited.

"Office Action of Japan Counterpart Application", issued on Sep. 4, 2012, with English translation thereof, p. 1-p. 4.

Satoru Nakayama, "Techniques for Complete Utilization of Google Mobile 14", with English description thereof, Weekly ASCII, Jun. 16, 2009, pp. 1-7, vol. 21, No. 739.

Weaver et al., "Multicast distribution and control for streaming multimedia," IECON'01 Proceedings of the 27th Annual Conference of the IEEE Industrial Electronics Society, Nov. 29, 2001, pp. 1806-1809, vol. 3, New York, US.

"Office Action of European Counterpart Application", issued on Sep. 4, 2013, p. 1-p. 11.

* cited by examiner

FLASH CONTENT NAVIGATION METHOD, MOBILE ELECTRONIC DEVICE, AND COMPUTER-READABLE MEDIUM

CROSS-REFERENCE TO RELATED APPLICATION

This application claims the priority benefit of U.S. provisional application No. 61/299,347, filed on Jan. 29, 2010. The entirety of the above-mentioned patent application is hereby incorporated by reference herein and made a part of this specification.

BACKGROUND OF THE APPLICATION

1. Field of the Application

The present application relates to a web content navigation method. More particularly, the present application relates to a flash content navigation method, a mobile electronic device, and a computer-readable medium.

2. Description of Related Art

With improvement of mobile technology, there are more and more mobile electronic devices provided with web page browsing functions, and hence, users in this information-exploded age can receive the most updated information through internet, any time and any where, without being limited by time and locations.

Presently, more and more web page designers have become accustomed to embedding flash contents into the web page to provide animation, video, and interactivity to users. However, since the flash content is originally designed for displaying on computer systems, if users want to view the flash content on mobile devices, as the flash content size may greatly exceed the screen size of mobile devices, viewing the flash content on mobile devices would be inconvenient.

Besides, the flash player for displaying the flash content is available as a plug-in of the browser, and in order to let users easily interact with the web page, signals generated by user gestures are sent to the browser engine, not to the flash engine. Therefore, whether or not to transmit the signal to the flash engine is determined by the browser. In some usage situation, when receiving a user gesture, the browser can not correctly distinguish whether the user is intended to operate the web page or the flash content, so that the reaction to the user gesture may not meet the user requirement.

SUMMARY OF THE APPLICATION

The present application is directed to a flash content navigation method, a mobile electronic device, and a computer-readable medium, wherein a flash content embedded in a web page can be display in full screen mode, and users can easily interact with the flash content.

The present application provides a flash content navigation method applicable for a mobile electronic device having a touch screen, wherein the flash content is embedded in a web page presented by a browser running on the mobile electronic device, a visible area within the web page is predetermined for displaying at least a portion of the flash content, and the flash content is rendered by a flash engine accessed by the browser. In the method, when a flash navigating signal is received, a full screen interface is popped up according to a size of the touch screen. If a size of the visible area is greater than the size of the touch screen, the flash content is scaled down so as to make the flash content displayed in the visible area fit the size of the touch screen, and the flash content displayed in the visible area is played back on the full screen interface by a scaled size of the flash content. When a flash interacting signal from the touch screen is received, the flash interacting signal is transmitted to the flash engine to perform an action on the flash content according to the flash interacting signal.

According to an embodiment of the application, wherein the flash navigating signal is generated according to a double-tap gesture on the touch screen, and the double-tap gesture is performed within the visible area.

According to an embodiment of the application, wherein after the step of popping up the full screen interface, the method further comprises if the size of the visible area is smaller than or equal to the size of the touch screen, playing back the flash content displayed in the visible area on the full screen interface by an original size of the flash content.

According to an embodiment of the application, wherein after the step of playing back the flash content displayed in the visible area on the full screen interface by the scaled size of the flash content, the method further comprises when receiving a resizing signal, resizing the flash content according to the resizing signal, when receiving a viewpoint moving signal, moving a viewpoint according to the viewpoint moving signal to display different portion of the flash content displayed in the visible area on the full screen interface, when receiving a scene dragging signal and if an original size of the flash content is greater than the size of the visible area, transmitting the scene dragging signal to the flash engine to drag the flash content according to the scene dragging signal, so as to display different portion of the flash content in the visible area, when receiving a fit-to-screen signal, resizing the flash content to make the flash content displayed in the visible area fit the size of the touch screen.

According to an embodiment of the application, wherein the step of resizing the flash content according to the resizing signal comprises if the resizing signal is generated according to a double-tap gesture on the touch screen, resizing the flash content to the original size of the flash content, so as to play back a partial of the flash content displayed in the visible area on the full screen interface, and if the resizing signal is generated according to a pinch gesture on the touch screen, zooming the flash content according to the pinch gesture, so as to play back a partial of the flash content on the full screen interface.

According to an embodiment of the application, wherein the viewpoint moving signal is generated according to a pan gesture on the touch screen, the scene dragging signal is generated according to a press and pan gesture on the touch screen, and the fit-to-screen signal is generated according to a double-tap gesture on the touch screen.

According to an embodiment of the application, wherein the flash interacting signal is generated according to a press and pan gesture or a single-tap gesture on the touch screen, and the step of transmitting the flash interacting signal to the flash engine to perform the action on the flash content according to the flash interacting signal comprises transmitting the flash interacting signal to the flash engine to invoke the action corresponding to the press and pan gesture or the single-tap gesture.

According to an embodiment of the application, the method further comprises when receiving an exit signal, closing the full screen interface, presenting the web page by the browser, and when receiving a signal from the touch screen, transmitting the signal to the browser.

According to an embodiment of the application, wherein the flash content is a Shockwave Flash (SWF) format.

The present application also provides a mobile electronic device comprising a touch screen, a flash engine providing module, a web page browsing module, and a flash content navigation module. In which, the flash engine providing module is used for providing a flash engine with a flash engine interface. The web page browsing module coupled to the touch screen and the flash engine providing module, the web page browsing module is used for launching a browser to retrieve and present a web page with a flash content on the touch screen, wherein the browser accesses the flash engine through the flash engine interface to render the flash content, and at least a portion of the flash content is displayed on a predetermined visible area within the web page. The flash content navigation module coupled to the touch screen and the flash engine providing module, the flash content navigation module is used for popping up a full screen interface according to a size of the touch screen when receiving a flash navigating signal. If a size of the visible area is greater than the size of the touch screen, the flash content navigation module scales down the flash content to make the flash content displayed in the visible area fit the size of the touch screen, and plays back the flash content displayed in the visible area on the full screen interface by a scaled size of the flash content. When receiving a flash interacting signal from the touch screen, the flash content navigation module transmits the flash interacting signal to the flash engine through the flash engine interface to perform an action on the flash content according to the flash interacting signal.

According to an embodiment of the application, wherein the flash navigating signal is generated according to a double-tap gesture on the touch screen, wherein the double-tap gesture is performed within the visible area.

According to an embodiment of the application, wherein the flash content navigation module plays back the flash content displayed in the visible area on the full screen interface by an original size of the flash content if the size of the visible area is smaller than or equal to the size of the touch screen.

According to an embodiment of the application, wherein when receiving a resizing signal, the flash content navigation module resizes the flash content according to the resizing signal. When receiving a viewpoint moving signal, the flash content navigation module moves a viewpoint according to the viewpoint moving signal to display different portion of the flash content displayed in the visible area on the full screen interface. When receiving a scene dragging signal and if an original size of the flash content is greater than the size of the visible area, the flash content navigation module transmits the scene dragging signal to the flash engine through the flash engine interface to drag the flash content according to the scene dragging signal, so as to display different portion of the flash content in the visible area. When receiving a fit-to-screen signal, the flash content navigation module resizes the flash content to make the flash content displayed in the visible area fit the size of the touch screen.

According to an embodiment of the application, wherein if the resizing signal is generated according to a double-tap gesture on the touch screen, the flash content navigation module resizes the flash content to the original size of the flash content, so as to play back a partial of the flash content displayed in the visible area on the full screen interface. If the resizing signal is generated according to a pinch gesture on the touch screen, the flash content navigation module zooms the flash content according to the pinch gesture, so as to play back a partial of the flash content on the full screen interface.

According to an embodiment of the application, wherein the viewpoint moving signal is generated according to a pan gesture on the touch screen, the scene dragging signal is generated according to a press and pan gesture on the touch screen, and the fit-to-screen signal is generated according to a double-tap gesture on the touch screen.

According to an embodiment of the application, wherein the flash interacting signal is generated according to a press and pan gesture or a single-tap gesture on the touch screen, the flash content navigation module transmits the flash interacting signal to the flash engine through the flash engine interface to invoke the action corresponding to the press and pan gesture or the single-tap gesture.

According to an embodiment of the application, wherein the flash content navigation module closes the full screen interface when receiving an exit signal, and then the web page is presented by the browser.

According to an embodiment of the application, wherein the flash content is a Shockwave Flash (SWF) format.

The present application further provides a computer-readable medium storing a computer program, which, when executed in a mobile electronic device having a touch screen, cause the mobile electronic device to perform the operations of retrieving a web page with a flash content by a browser running on the mobile electronic device, wherein a visible area within the web page is predetermined for displaying at least a portion of the flash content, and the flash content is rendered by a flash engine accessed by the browser, receiving a flash navigating signal, popping up a full screen interface according to a size of the touch screen, scaling down the flash content to make the flash content displayed in the visible area fit the size of the touch screen if a size of the visible area is greater than the size of the touch screen, playing back the flash content displayed in the visible area on the full screen interface by a scaled size of the flash content, and when receiving a flash interacting signal from the touch screen, transmitting the flash interacting signal to the flash engine to perform an action on the flash content according to the flash interacting signal.

In the present application, a flash content embedded in a web page will be display in a full screen interface after receiving a specific gesture on the touch screen, and then gestures performed by the user can be distinguished clearly. Hence, providing an easier way to navigate the flash content on the mobile electronic device, and facilitating the interaction between the user and the flash content.

In order to make the aforementioned and other features and advantages of the present application comprehensible, several exemplary examples accompanied with figures are described in detail below.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DESCRIPTION

Figure 1:
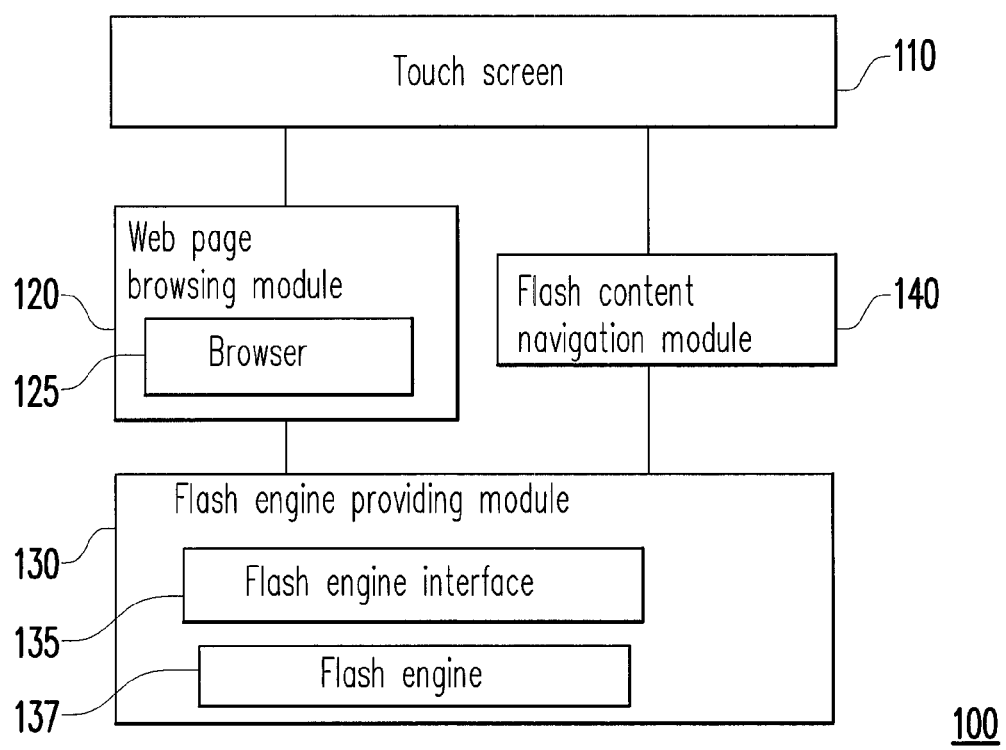
FIG. 1 is a block diagram illustrating a mobile electronic device according to an example of the present application.

FIG. 1 is a block diagram illustrating a mobile electronic device according to an example of the present application. As shown in FIG. 1, a mobile electronic device 100 of the present embodiment comprises a touch screen 110, a web page browsing module 120, a flash engine providing module 130, and a flash content navigation module 140. The mobile electronic device 100 may be, for example but not limited to, a mobile phone, a smart phone, a personal digital assistant, a palmtop play station (such as PSP/GBA), and the scope thereof is not limited herein.

The touch screen 110 is, for example, a resistive touch screen or a capacitive touch screen. The touch screen 110 is used for being an input/output device of the mobile electronic device 100. For example, a user may input data or instructions into the mobile electronic device 100 through the touch screen 110, and the corresponding reaction of the mobile electronic device 100 is displayed on the touch screen 110.

The web page browsing module 120 couples to the touch screen 110 and the flash engine providing module 130. The web page browsing module 120 is used for providing and launching a browser 125 to retrieve data of a web page from a web server (not shown). After parsing the web page data, the browser 125 presents the web page on the touch screen 110. If the web page retrieved by the browser 125 has a flash content embedded therein, the browser 125 accesses a flash engine 137 through a flash engine interface 135 provided by the flash engine providing module 130, so as to render the flash content by the flash engine 137.

The flash content navigation module 140 couples to the touch screen 110 and the flash engine providing module 130. The flash content navigation module 140 is used for creating a full screen interface to display the flash content embedded in the web page, so as to facilitate the user to navigate the flash content by using the mobile electronic device 100. Once the flash content is displayed on the full screen interface, user gestures on the touch screen 110 will be regarded as operations related to the flash content, so that the mobile electronic device 100 can provide a more accurate reaction to the user gestures, and the convenience of navigating the flash content by using the mobile electronic device 100 can be improved.

Figure 2A:
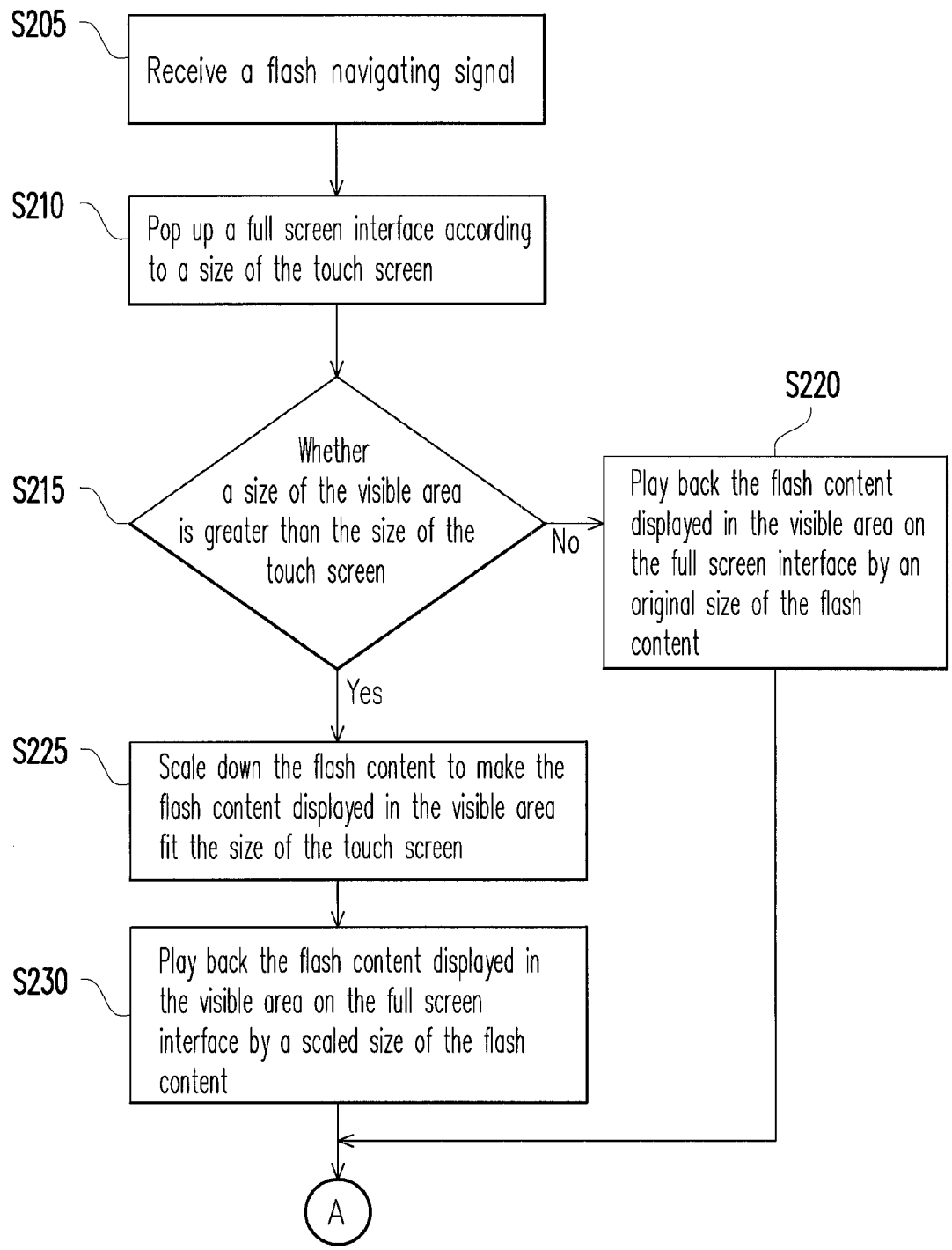
FIGS. 2A and 2B are flowcharts illustrating a flash content navigation method according to another example of the present application.
Figure 2B:
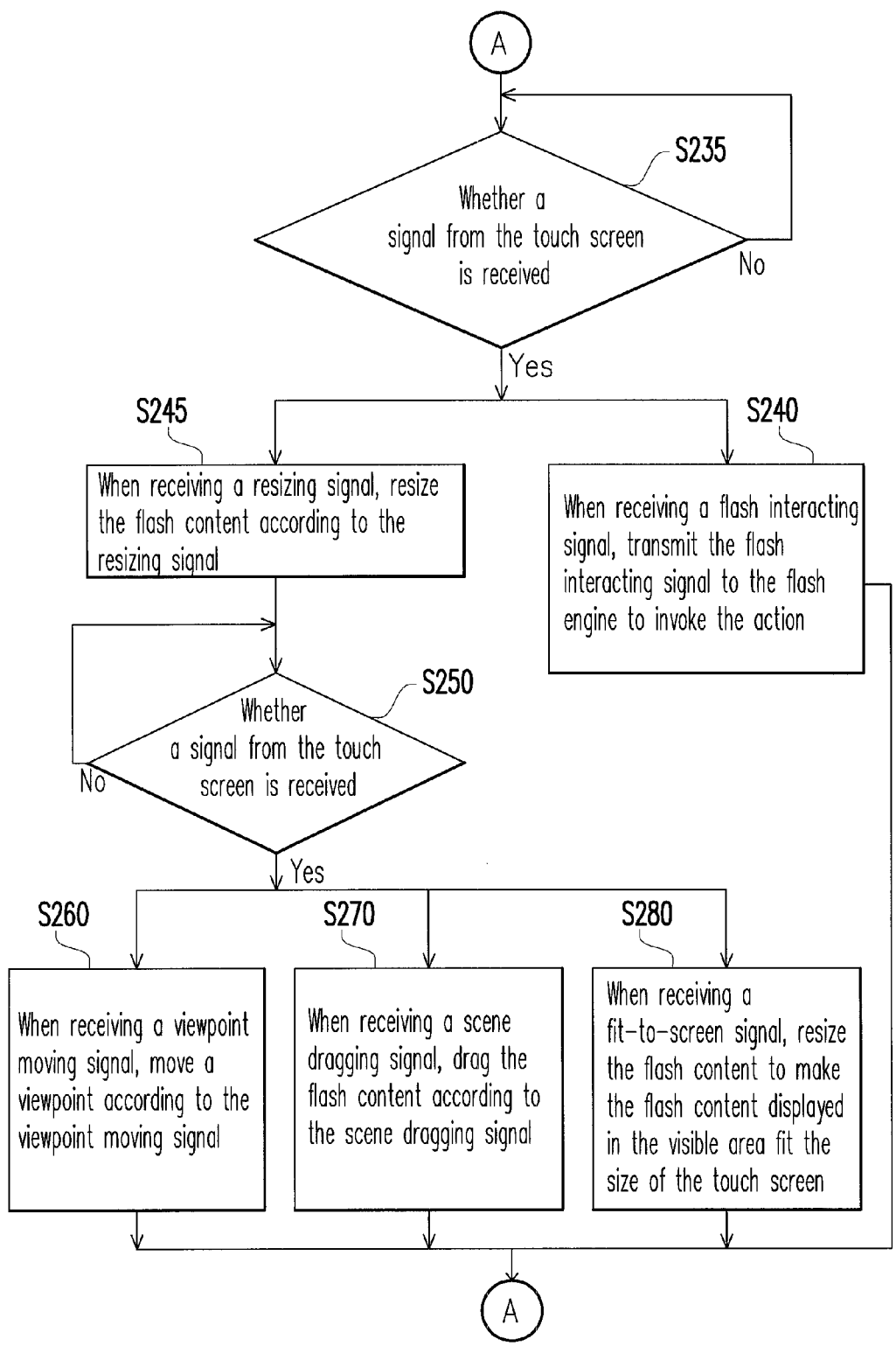

FIGS. 2A and 2B are flowcharts illustrating a flash content navigation method according to another example of the present application. In this embodiment, the web page is displayed on the touch screen 110 by the browser 125, wherein a visible area within the web page is predetermined for displaying at least a portion of the flash content. To be specific, if an original size of the flash content is greater than a size of the visible area, the visible area displays a portion of the flash content. However, if the original size of the flash content is small than or equal to the size of the visible area, the visible area displays the whole flash content.

Referring to FIG. 2A, in step S205, the flash content navigation module 140 receives a flash navigating signal. In this embodiment, the flash navigating signal is generated according to a double-tap gesture on the touch screen 110, wherein the double-tap gesture is performed within the visible area. In the other embodiment, the flash navigating signal may be generated by pressing a physical key on the mobile electronic device 100 or a virtual key displayed by the touch screen 110.

In step S210, the flash content navigation module 140 pops up a full screen interface according to a size of the touch screen 110. The full screen interface is displayed above the window provided by the browser 120 and has the same size as the touch screen 110. Is should be noted that, after receiving the flash navigating signal, signals from the touch screen 110 will no longer send to the browser 125.

Next, in order to display the flash content in an appropriate way, in step S215, the flash content navigation module 140 determines whether the size of the visible area is greater than the size of the touch screen 110.

If the size of the visible area is smaller than or equal to the size of the touch screen 110, in step S220, the flash content navigation module 140 does not change the size of the flash content, and plays back the flash content displayed in the visible area on the full screen interface by the original size of the flash content. To be specific, if the size of the flash content is smaller than or equal to the size of the visible area, the entire flash content is displayed in the visible area, thus the user can see the whole flash content on the full screen interface by the original size. However, if the size of the flash content is greater than the size of the visible area, the user can only see the partial flash content (i.e. the flash content displayed in the visible area) by the original size.

Figure 3:
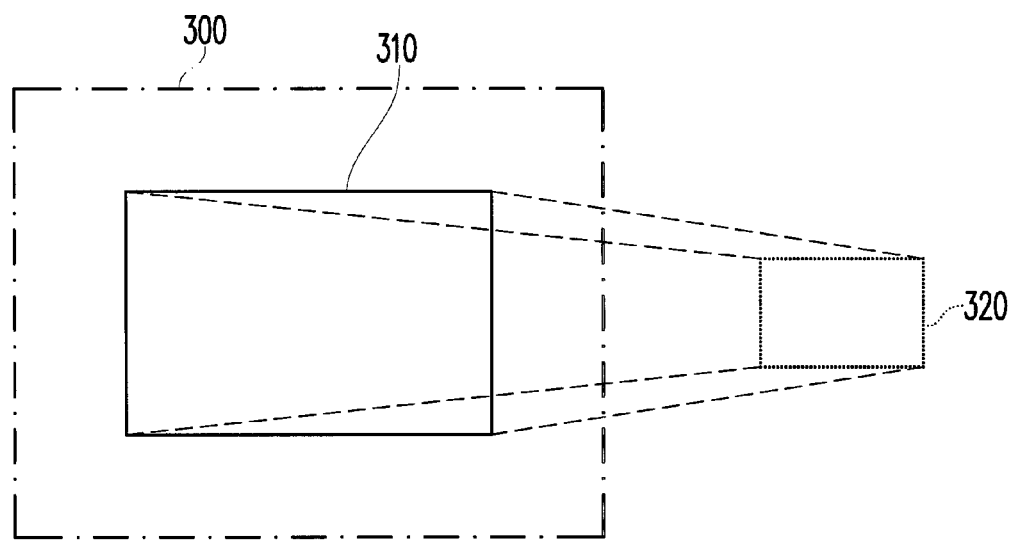
FIGS. 3 to 6 are diagrams illustrating a relationship between a flash content, a visible area and a full screen interface according to an example of the present application.

If the size of the visible area is greater than the size of the touch screen 110, in step S225, the flash content navigation module 140 scales down the flash content to make the flash content displayed in the visible area fit the size of the touch screen 110. And in step 230, the flash content navigation module 140 plays back the flash content displayed in the visible area on the full screen interface by a scaled size of the flash content. FIG. 3 is a diagram illustrating a relationship between a flash content, a visible area and a full screen interface according to an example of the present application. Referring to FIG. 3, the full screen interface 320 has the same size as the touch screen 110. The flash content 300 is scaled down until the flash content belonging to the visible area 310 fit the size of the full screen interface 320. Hence, the flash content 300 is displayed by a scaled size smaller than the original size, so that the user may view the flash content within the visible area 310 on the full screen interface 320.

After playing back the flash content on the full screen interface, the user may interact with the flash content through the touch screen 110. Accordingly, referring to FIG. 2B, in step S235, the flash content navigation module 140 determines whether any signal from the touch screen 110 is received. That is, the flash content navigation module 140 determines whether the user performs any gesture on the touch screen 110.

The step S235 will be repeated until the flash content navigation module 140 receives a signal from the touch screen 110, and then the flash content navigation module 140 can determine a type of the signal.

If the received signal is a flash interacting signal which is generated according to a pan gesture or a single-tap gesture on the touch screen 110, in step S240, the flash content navigation module 140 transmits the flash interacting signal to the flash engine 137 through the flash engine interface 135, so as to invoke the action corresponding to the press and pan gesture or the single-tap gesture. For example, if the user applies the pan gesture on a movable control within the flash content, the flash engine 137 may render the flash content in accordance with the movement. If the user applies the single-tap gesture on an executable control within the flash content, the flash engine 137 may render execution result of the flash content.

Figure 4:
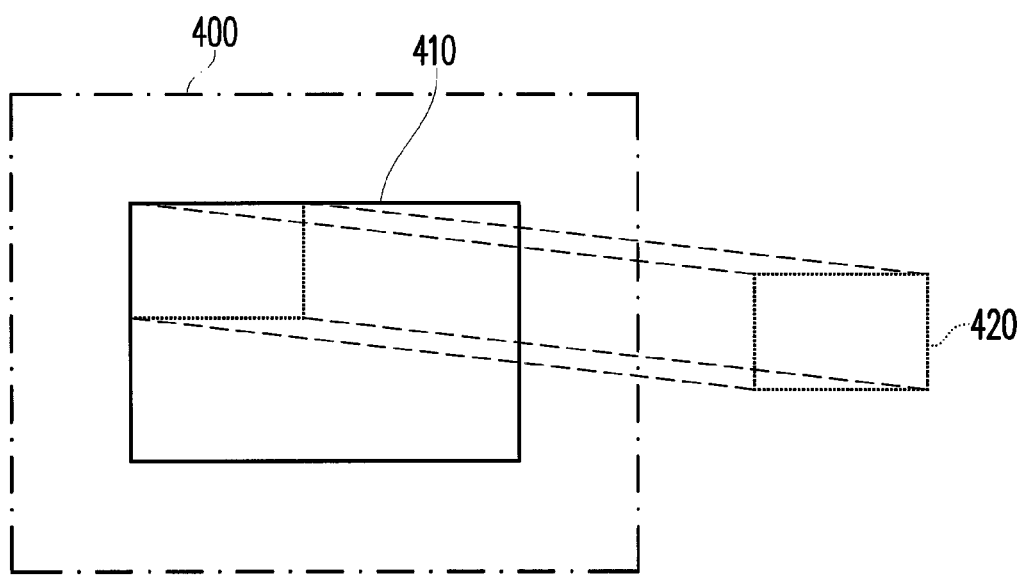

As shown in step S245, when the received signal is a resizing signal, the flash content navigation module 140 resizes the flash content according to the resizing signal. In this embodiment, there are two gesture can generate the resizing signal. To be specific, if the resizing signal is generated according to a double-tap gesture on the touch screen 110, the flash content navigation module 140 resizes the flash content to the original size of the flash content. In the embodiment, the flash content navigation module 140 enlarges the flash content so as to play back a partial of the flash content displayed in the visible area on the full screen interface. FIG. 4 is a diagram illustrating a relationship between a flash content, a visible area and a full screen interface according to another example of the present application. Referring to FIG. 4, the flash content navigation module 140 enlarges the entire flash content 400 to the original size thereof, and displays the upper-left corner of the visible area 410 on the full screen interface 420 (with the same size of the touch screen 110), so that the user can only view the upper-left portion of the flash content displayed in the visible area 410 through the touch screen 110. If the resizing signal is generated according to a pinch gesture on the touch screen 110, the flash content navigation module 140 zooms in or zooms out the flash content according to the pinch gesture, so as to play back a partial of the flash content on the full screen interface.

Next, in step S250, the flash content navigation module 140 determines whether any signal from the touch screen 110 is received. When receiving a signal, the flash content navigation module 140 determines a type of the signal.

Figure 5:
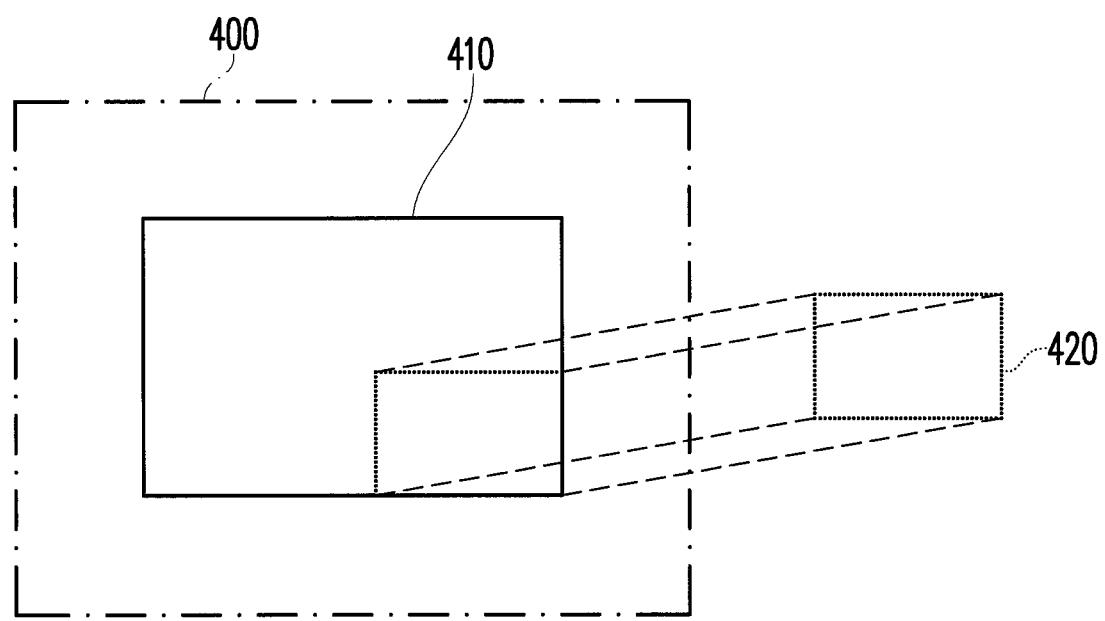

In step S260, when receiving a viewpoint moving signal, the flash content navigation module 140 determines whether the flash content belonging to the visible area is displayed on the full screen interface completely. If no, the flash content navigation module 140 moves a viewpoint according to the viewpoint moving signal to display different portion of the flash content displayed in the visible area on the full screen interface. In this embodiment, the viewpoint moving signal is generated according to a pan gesture on the touch screen 110, but is not limited herein. For example, as shown in FIG. 5, the user may perform the pan gesture on the touch screen 110 to make the flash content navigation module 140 displays the lower-right corner of the visible area 410 on the full screen interface 420. However, referring to both FIG. 4 and FIG. 5, the relative position between the flash content 400 and the visible area 410 is not changed by the viewpoint moving signal.

Figure 6:
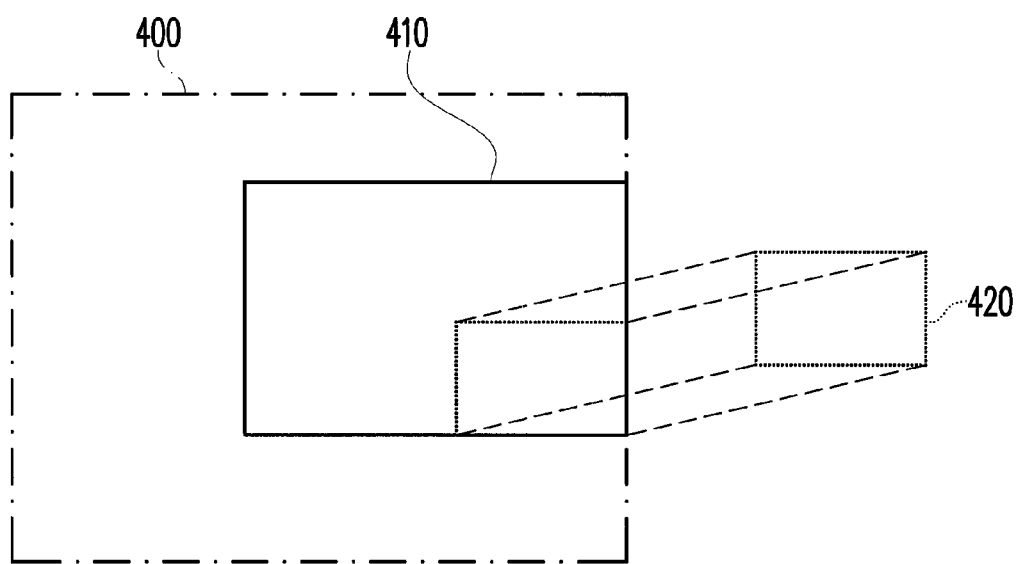

In step S270, when receiving a scene dragging signal, the flash content navigation module 140 determines whether the original size of the flash content is greater than the size of the visible area. If yes, the flash content navigation module 140 transmits the scene dragging signal to the flash engine 137 through the flash engine interface 135 to drag the flash content according to the scene dragging signal, so as to display different portion of the flash content in the visible area. In this embodiment, the scene dragging signal is generated according to a press and pan gesture on the touch screen 110, but is not limited herein. For example, as shown in FIG. 5, the central portion of the flash content 400 is displayed in the visible area 410. While the user performs the press and pan gesture on the touch screen 110 from right to left horizontally, as shown in FIG. 6, the flash engine 137 drags the flash content 400 horizontally to display the other portion of the flash content 400 in the visible area 410. Referring to both FIG. 5 and FIG. 6, since the scene dragging signal may change the relative position between the flash content 400 and the visible area 410, the user can view the whole flash content 400 on the full screen interface 420 by performing the press and pan gesture.

In step S280, when receiving a fit-to-screen signal, the flash content navigation module 140 resizes the flash content to make the flash content displayed in the visible area fit the size of the touch screen 110. In the embodiment, the fit-to-screen signal is generated according to a double-tap gesture on the touch screen 110, but is not limited herein. Hence, if the user performs the double-tap gesture on the touch screen 110, the entire content with in visible area will be displayed on the full screen interface (as shown in FIG. 3).

In the forgoing embodiments, the flash content is a Shockwave Flash (SWF) format. After receiving the flash navigating signal to pop up the full screen interface to display the flash content, the user may perform the double-tap gesture, the single-tap gesture, the pinch gesture, the pan gesture, and the press and pan gesture on the touch screen 110 to interact with the flash content. However, the relationship between the gestures and the flash interacting signal, the resizing signal, the viewpoint moving signal, the scene dragging signal, and the fit-to-screen signal described in the foregoing embodiments is only an exemplar of the present application and is not used to limit the scope of the present application. The steps in FIG. 2B will be repeated until an exit signal which is generated by, for example, pressing a specific physical key (e.g. a return key) on the mobile electronic device 100 is received. After receiving the exit signal, the flash content navigation module 140 closes the full screen interface. Thereupon, the browser 125 presents the web page on the touch screen 110, and then all signals from the touch screen 110 are transmitted to the browser 125.

In other embodiment, if the flash content is a Flash Video (FLV) format, after receiving the flash navigating signal to pop up the full screen interface, the flash content navigation module 140 plays back the flash content on the full screen interface. Similarly, the flash content navigation module 140 closes the full screen interface when receiving the exit signal.

The present application also provides a computer-readable medium. The computer-readable medium stores a computer program composed of a plurality of program instructions. These program instructions can be loaded into an electronic device having a touch screen and executed by the same to accomplish the steps in the flash content navigation method in embodiments described above. The computer-readable medium may be a real only memory, a random access memory, a magnetic tape, a floppy disc, a compact disc, or a transmission medium.

In the present application, a full screen interface is popped up for displaying a flash content embedded in a web page, and the flash content is scaled down if the size of the flash content exceeds the size of the touch screen. Hence, the user can easily navigate the flash content within the visible area. Besides, after popping up the full screen interface to display the flash content, the user gesture on the touch screen will be regarded as the operation of the flash content. Thus, the user can interact with the controls within the flash content. Furthermore, by recognizing different user gestures, the operations such as resizing the flash content, moving the viewpoint, and dragging the flash content can be performed correctly. Consequently, the convenience of navigating the flash content on the mobile electronic device can be improved significantly.

It will be apparent to those skilled in the art that various modifications and variations can be made to the structure of the present application without departing from the scope or spirit of the application. In view of the foregoing descriptions, it is intended that the present application covers modifications and variations of this application if they fall within the scope of the following claims and their equivalents.

What is claimed is:

1. A flash content navigation method, applicable for a mobile electronic device having a touch screen, the method comprising:
   presenting a web page by a browser running on the mobile electronic device;
   displaying at least a portion of the flash content embedded in the web page in a visible area predetermined within the web page, wherein the flash content is rendered by a flash engine accessed by the browser;

receiving a flash navigating signal;
popping up a full screen interface according to a size of the touch screen;
if a size of the visible area is greater than the size of the touch screen, scaling down the flash content to make the flash content displayed in the visible area fit the size of the touch screen;
playing back the flash content displayed in the visible area on the full screen interface by a scaled size of the flash content;
when receiving a viewpoint moving signal, moving a viewpoint according to the viewpoint moving signal to display different portion of the flash content displayed in the visible area on the full screen interface spatially;
when receiving a scene dragging signal and if an original size of the flash content is greater than the size of the visible area, transmitting the scene dragging signal to the flash engine to drag the flash content according to the scene dragging signal, so as to display different portion of the flash content in the visible area spatially; and
when receiving a flash interacting signal from the touch screen, transmitting the flash interacting signal to the flash engine to perform an action on the flash content according to the flash interacting signal.

2. The method as claimed in claim 1, wherein the flash navigating signal is generated according to a double-tap gesture on the touch screen, wherein the double-tap gesture is performed within the visible area.

3. The method as claimed in claim 1, the method further comprises:
if the size of the visible area is smaller than or equal to the size of the touch screen, playing back the flash content displayed in the visible area on the full screen interface by an original size of the flash content.

4. The method as claimed in claim 1, wherein after the step of playing back the flash content displayed in the visible area on the full screen interface by the scaled size of the flash content, the method further comprises:
when receiving a resizing signal, resizing the flash content according to the resizing signal; and
when receiving a fit-to-screen signal, resizing the flash content to make the flash content displayed in the visible area fit the size of the touch screen.

5. The method as claimed in claim 4, wherein the step of resizing the flash content according to the resizing signal comprises:
if the resizing signal is generated according to a double-tap gesture on the touch screen, resizing the flash content to the original size of the flash content, so as to play back a partial of the flash content displayed in the visible area on the full screen interface; and
if the resizing signal is generated according to a pinch gesture on the touch screen, zooming the flash content according to the pinch gesture, so as to play back a partial of the flash content on the full screen interface.

6. The method as claimed in claim 4, wherein the viewpoint moving signal is generated according to a pan gesture on the touch screen, the scene dragging signal is generated according to a press and pan gesture on the touch screen, and the fit-to-screen signal is generated according to a double-tap gesture on the touch screen.

7. The method as claimed in claim 1, wherein the flash interacting signal is generated according to a pan gesture or a single-tap gesture on the touch screen, and the step of transmitting the flash interacting signal to the flash engine to perform the action on the flash content according to the flash interacting signal comprises:

transmitting the flash interacting signal to the flash engine to invoke the action corresponding to the pan gesture or the single-tap gesture.

8. The method as claimed in claim 1, further comprising:
when receiving an exit signal, closing the full screen interface;
presenting the web page by the browser; and
when receiving a signal from the touch screen, transmitting the signal to the browser.

9. The method as claimed in claim 1, wherein the flash content is a Shockwave Flash (SWF) format.

10. A mobile electronic device comprising:
a touch screen;
a flash engine providing module, for providing a flash engine and a flash engine interface;
a web page browsing module, coupled to the touch screen and the flash engine providing module, the web page browsing module comprising:
a browser for receiving and presenting a web page with a flash content on the touch screen, and accessing the flash engine through the flash engine interface to render the flash content, wherein at least a portion of the flash content is displayed on a predetermined visible area within the web page; and
a flash content navigation module, coupled to the touch screen and the flash engine providing module, for popping up a full screen interface according to a size of the touch screen when receiving a flash navigating signal,
wherein if a size of the visible area is greater than the size of the touch screen, the flash content navigation module scales down the flash content to make the flash content displayed in the visible area fit the size of the touch screen, and plays back the flash content displayed in the visible area on the full screen interface by a scaled size of the flash content,
when receiving a viewpoint moving signal, the flash content navigation module moves a viewpoint according to the viewpoint moving signal to display different portion of the flash content displayed in the visible area on the full screen interface spatially,
when receiving a scene dragging signal and if an original size of the flash content is greater than the size of the visible area, the flash content navigation module transmits the scene dragging signal to the flash engine through the flash engine interface to drag the flash content according to the scene dragging signal, so as to display different portion of the flash content in the visible area spatially,
when receiving a flash interacting signal from the touch screen, the flash content navigation module transmits the flash interacting signal to the flash engine through the flash engine interface to perform an action on the flash content according to the flash interacting signal.

11. The mobile electronic device as claimed in claim 10, wherein the flash navigating signal is generated according to a double-tap gesture on the touch screen, wherein the double-tap gesture is performed within the visible area.

12. The mobile electronic device as claimed in claim 10, wherein the flash content navigation module plays back the flash content displayed in the visible area on the full screen interface by an original size of the flash content if the size of the visible area is smaller than or equal to the size of the touch screen.

13. The mobile electronic device as claimed in claim 10, wherein when receiving a resizing signal, the flash content navigation module resizes the flash content according to the resizing signal, and when receiving a fit-to-screen signal, the flash content navigation module resizes the flash content to make the flash content displayed in the visible area fit the size of the touch screen.

14. The mobile electronic device as claimed in claim 13, wherein if the resizing signal is generated according to a double-tap gesture on the touch screen, the flash content navigation module resizes the flash content to the original size of the flash content, so as to play back a partial of the flash content displayed in the visible area on the full screen interface, and if the resizing signal is generated according to a pinch gesture on the touch screen, the flash content navigation module zooms the flash content according to the pinch gesture, so as to play back a partial of the flash content on the full screen interface.

15. The mobile electronic device as claimed in claim 13, wherein the viewpoint moving signal is generated according to a pan gesture on the touch screen, the scene dragging signal is generated according to a press and pan gesture on the touch screen, and the fit-to-screen signal is generated according to a double-tap gesture on the touch screen.

16. The mobile electronic device as claimed in claim 10, wherein the flash interacting signal is generated according to a pan gesture or a single-tap gesture on the touch screen, the flash content navigation module transmits the flash interacting signal to the flash engine through the flash engine interface to invoke the action corresponding to the pan gesture or the single-tap gesture.

17. The mobile electronic device as claimed in claim 10, wherein the flash content navigation module closes the full screen interface when receiving an exit signal, and then the web page is presented by the browser.

18. The mobile electronic device as claimed in claim 10, wherein the flash content is a Shockwave Flash (SWF) format.

19. A non-transitory computer readable medium storing a computer program, which, when executed in a mobile electronic device having a touch screen, cause the mobile electronic device to perform the operations of:
  retrieving a web page with a flash content by a browser running on the mobile electronic device, wherein a visible area within the web page is predetermined for displaying at least a portion of the flash content, and the flash content is rendered by a flash engine accessed by the browser;
  receiving a flash navigating signal;
  popping up a full screen interface according to a size of the touch screen;
  if a size of the visible area is greater than the size of the touch screen, scaling down the flash content to make the flash content displayed in the visible area fit the size of the touch screen;
  playing back the flash content displayed in the visible area on the full screen interface by a scaled size of the flash content;
  when receiving a viewpoint moving signal, moving a viewpoint according to the viewpoint moving signal to display different portion of the flash content displayed in the visible area on the full screen interface spatially;
  when receiving a scene dragging signal and if an original size of the flash content is greater than the size of the visible area, transmitting the scene dragging signal to the flash engine to drag the flash content according to the scene dragging signal, so as to display different portion of the flash content in the visible area spatially; and
  when receiving a flash interacting signal from the touch screen, transmitting the flash interacting signal to the flash engine to perform an action on the flash content according to the flash interacting signal.

* * * * *